Figure 39:
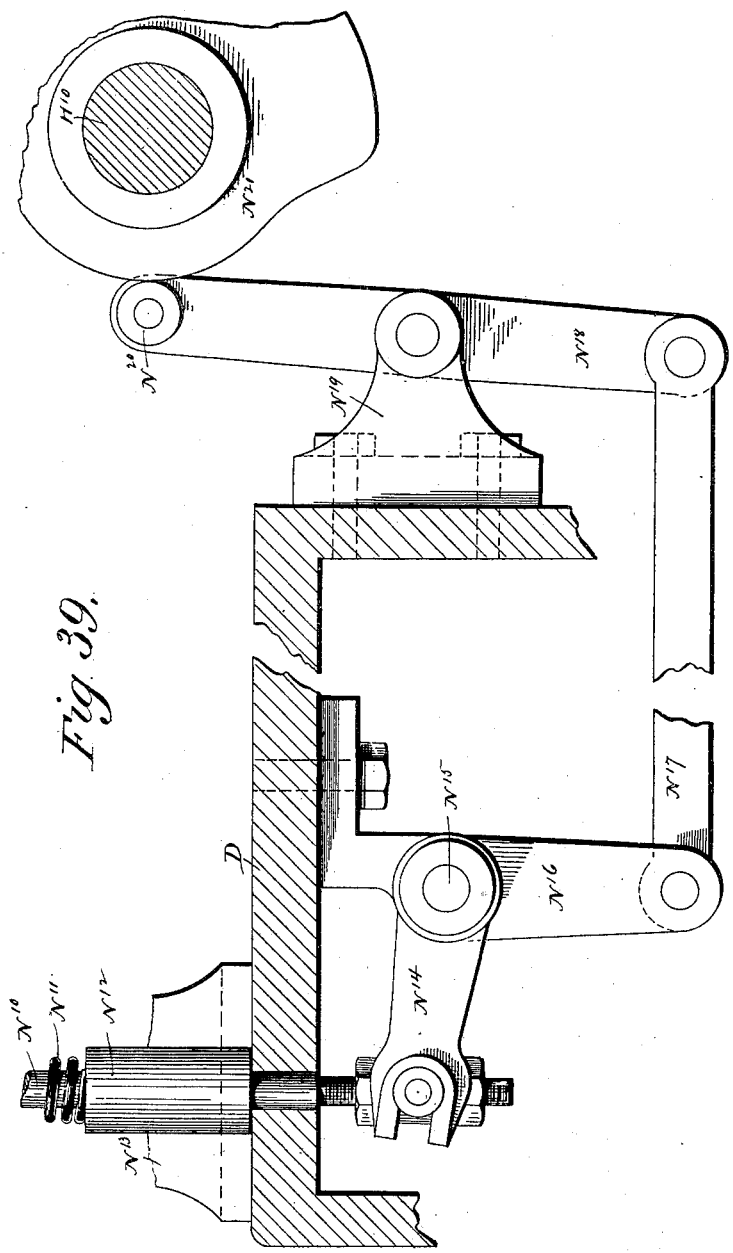

No. 649,327. Patented May 8, 1900.
F. J. LUDINGTON.
MACHINE FOR MAKING CIGARETTE PACKAGES.
(Application filed Apr. 4, 1898.)
(No Model.) 16 Sheets—Sheet 1.
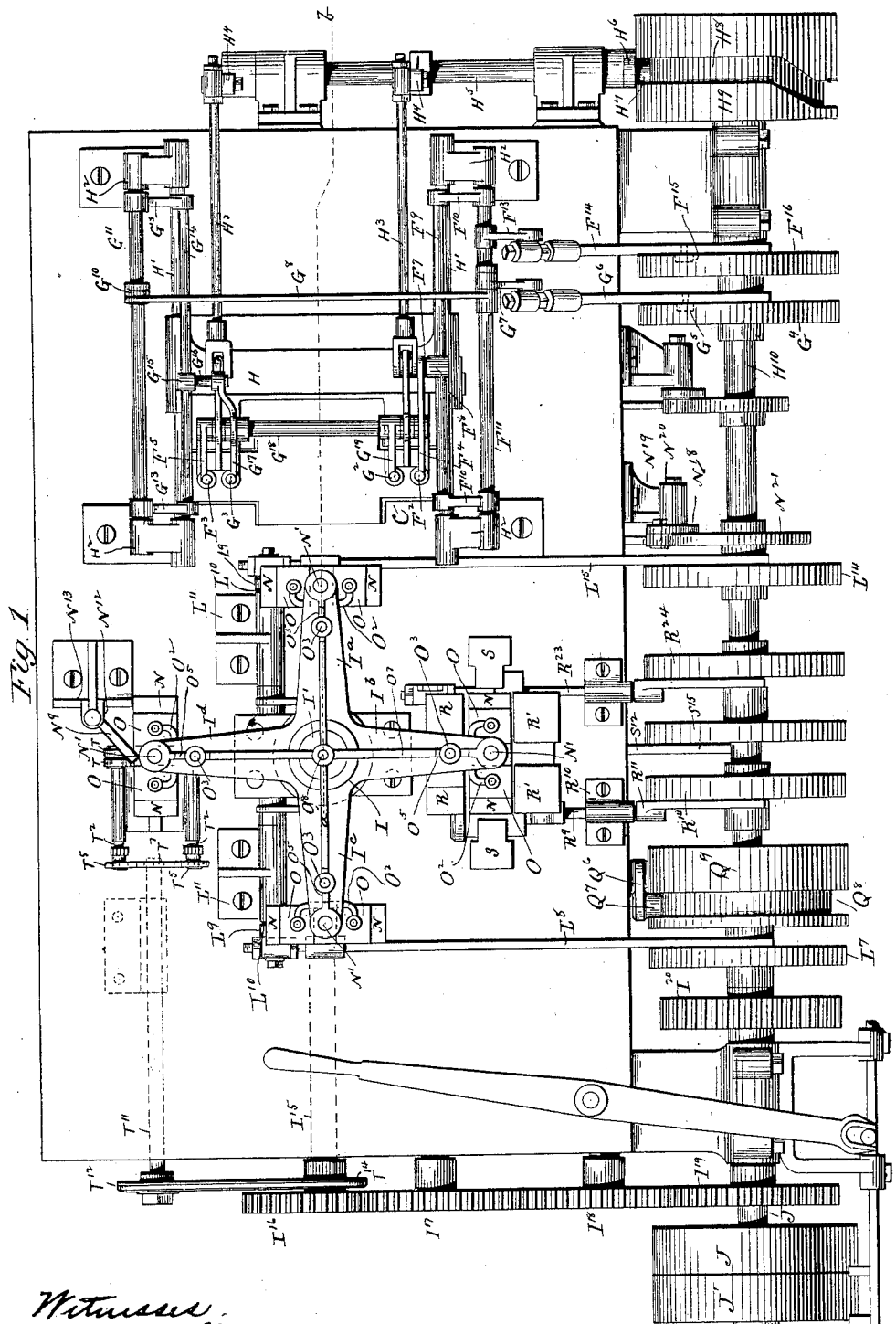

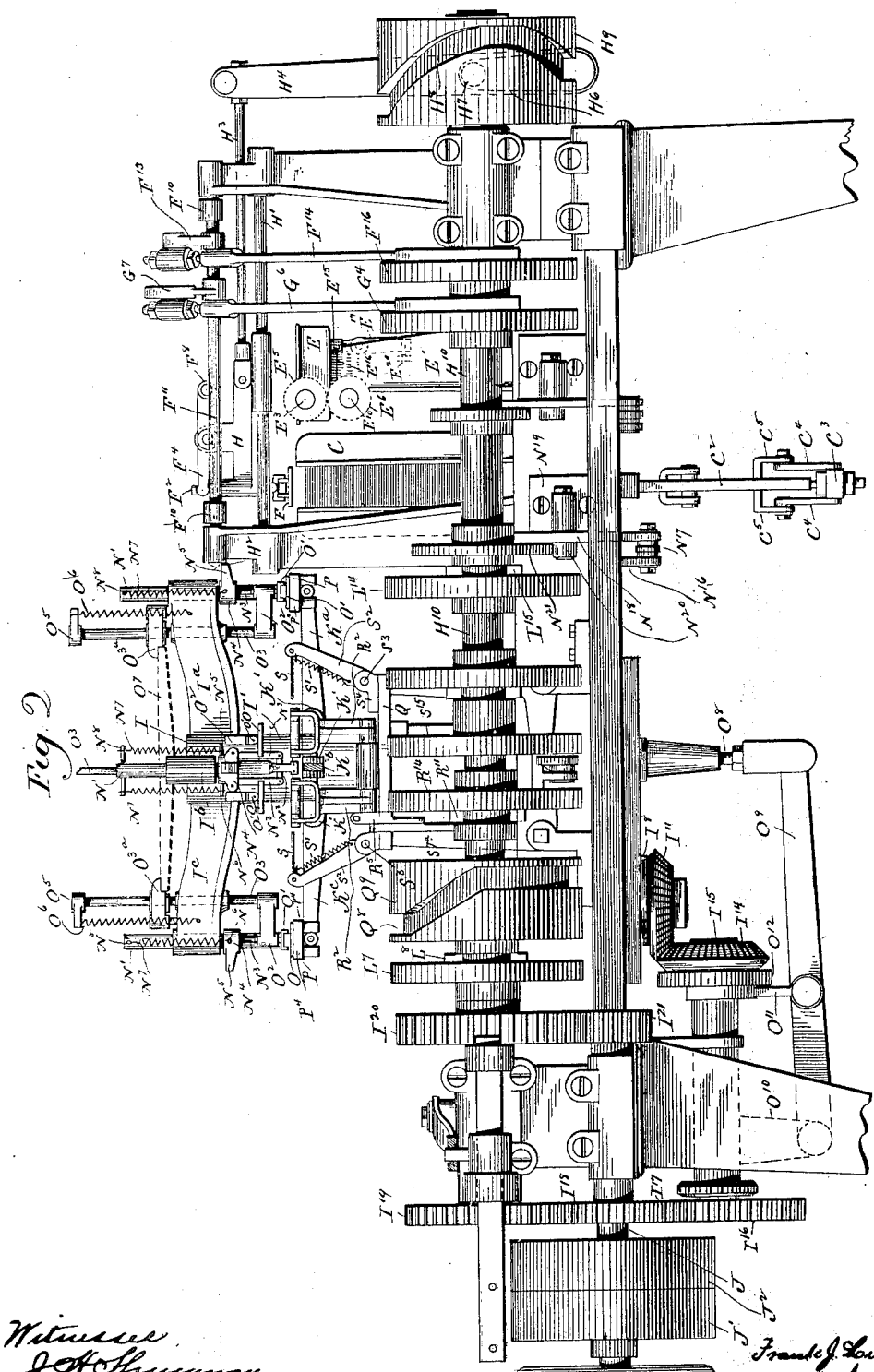

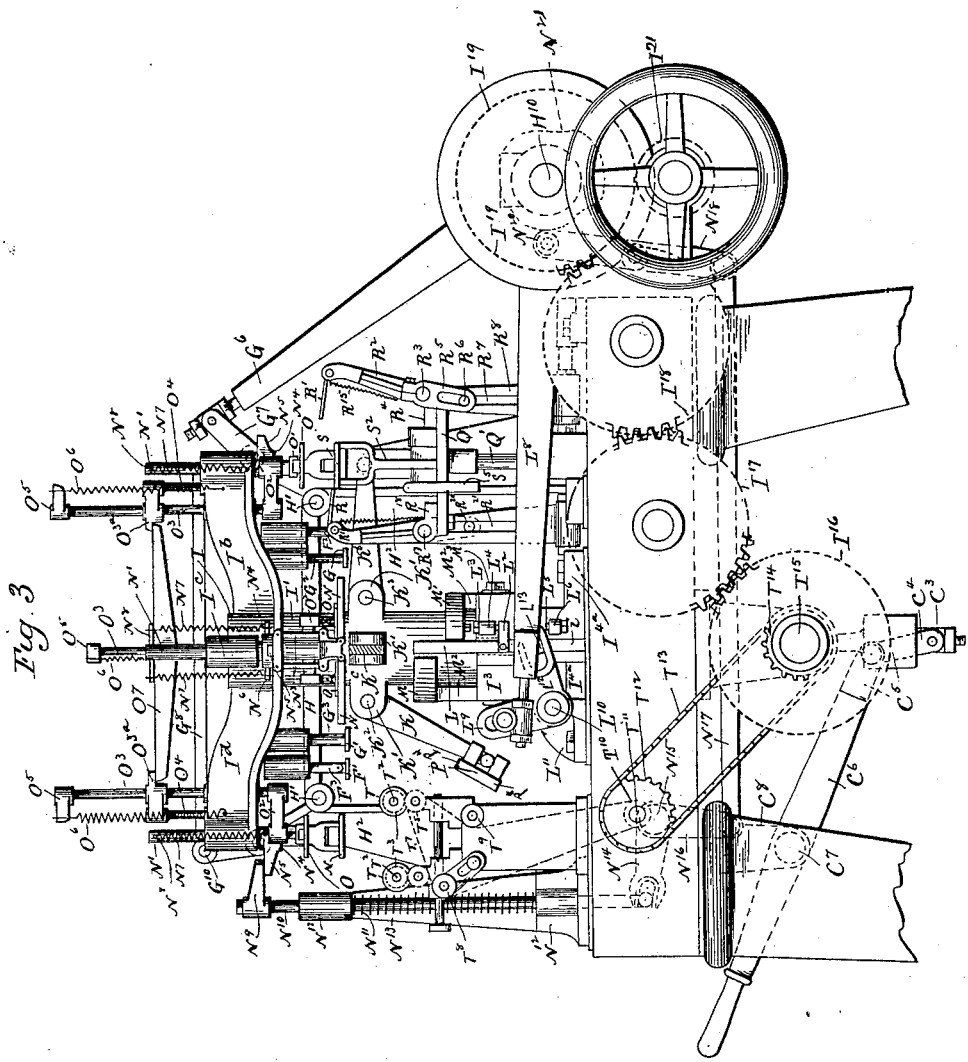

No. 649,327. Patented May 8, 1900.
F. J. LUDINGTON.
MACHINE FOR MAKING CIGARETTE PACKAGES.
(Application filed Apr. 4, 1898.)
(No Model.) 16 Sheets—Sheet 4.
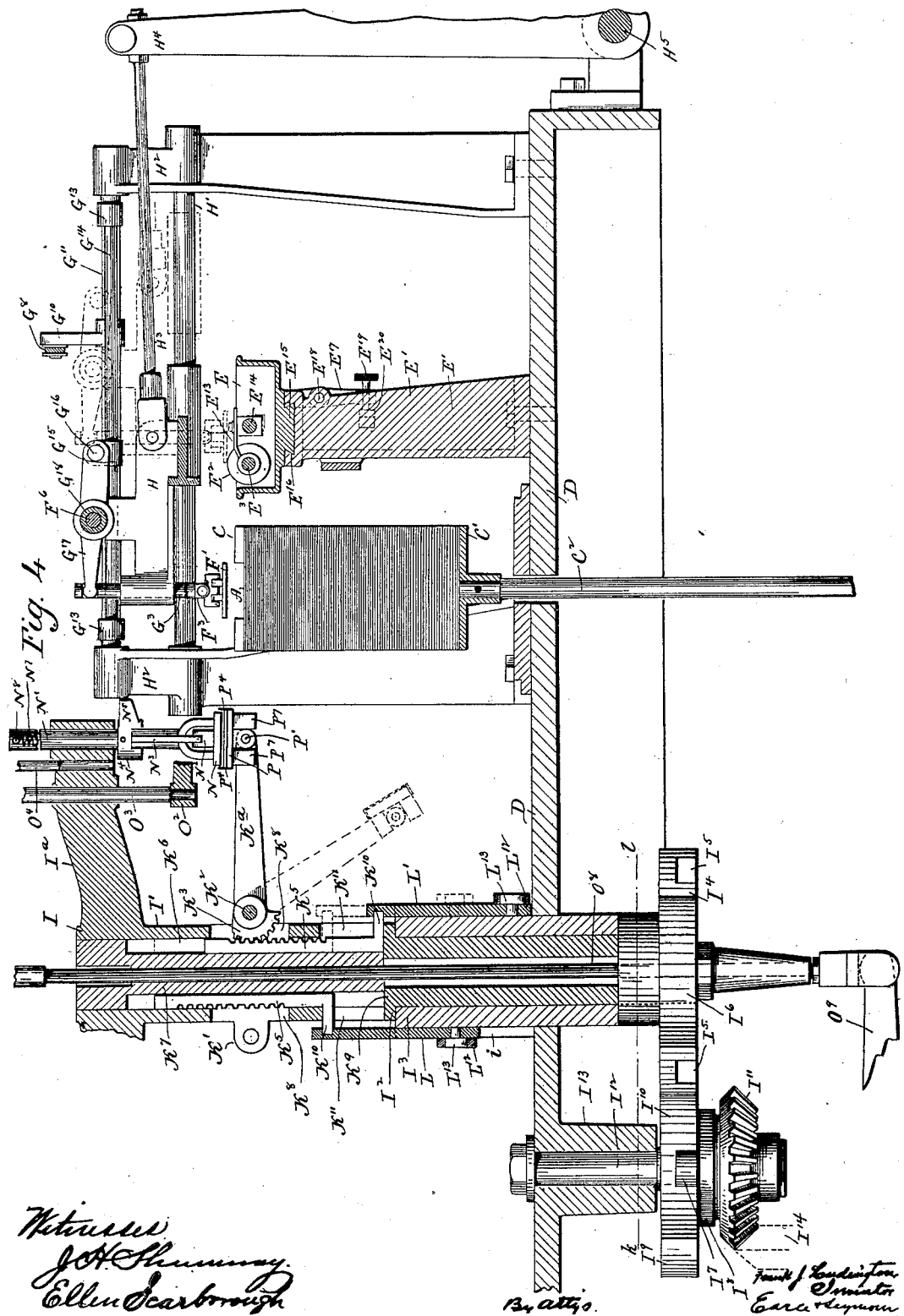

No. 649,327. Patented May 8, 1900.
F. J. LUDINGTON.
MACHINE FOR MAKING CIGARETTE PACKAGES.
(Application filed Apr. 4, 1898.)
(No Model.) 16 Sheets—Sheet 5.
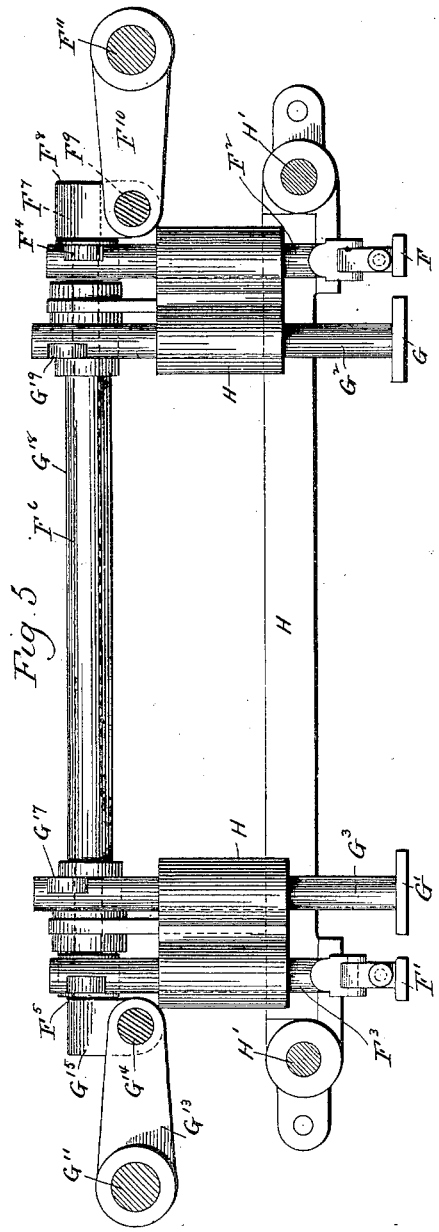
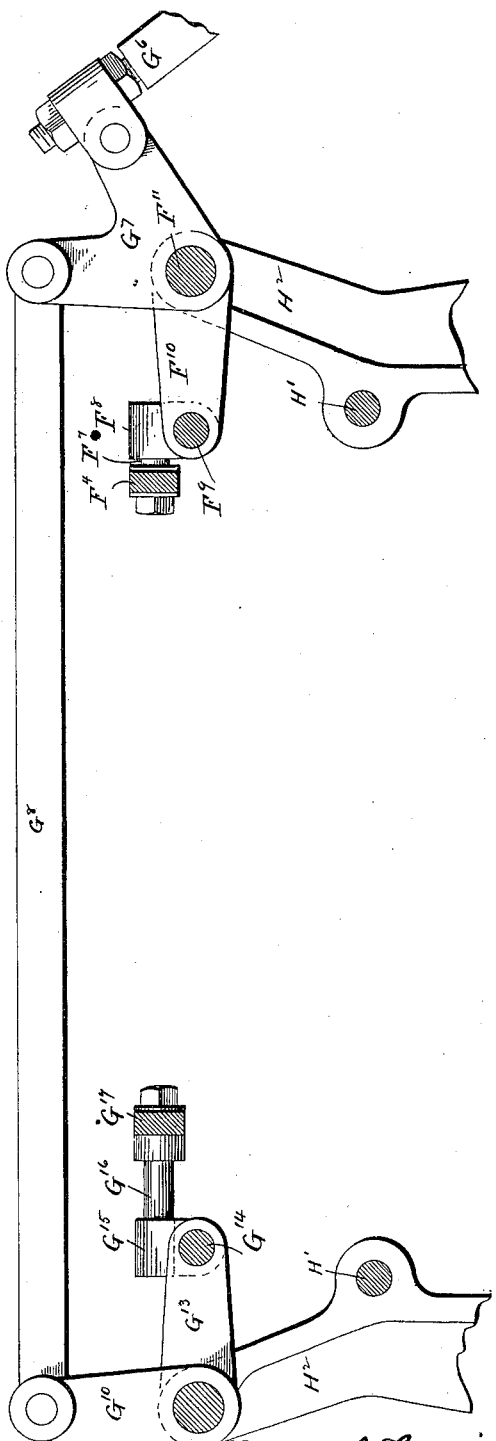

No. 649,327. Patented May 8, 1900.
F. J. LUDINGTON.
MACHINE FOR MAKING CIGARETTE PACKAGES.
(Application filed Apr. 4, 1898.)
(No Model.) 16 Sheets—Sheet 6.
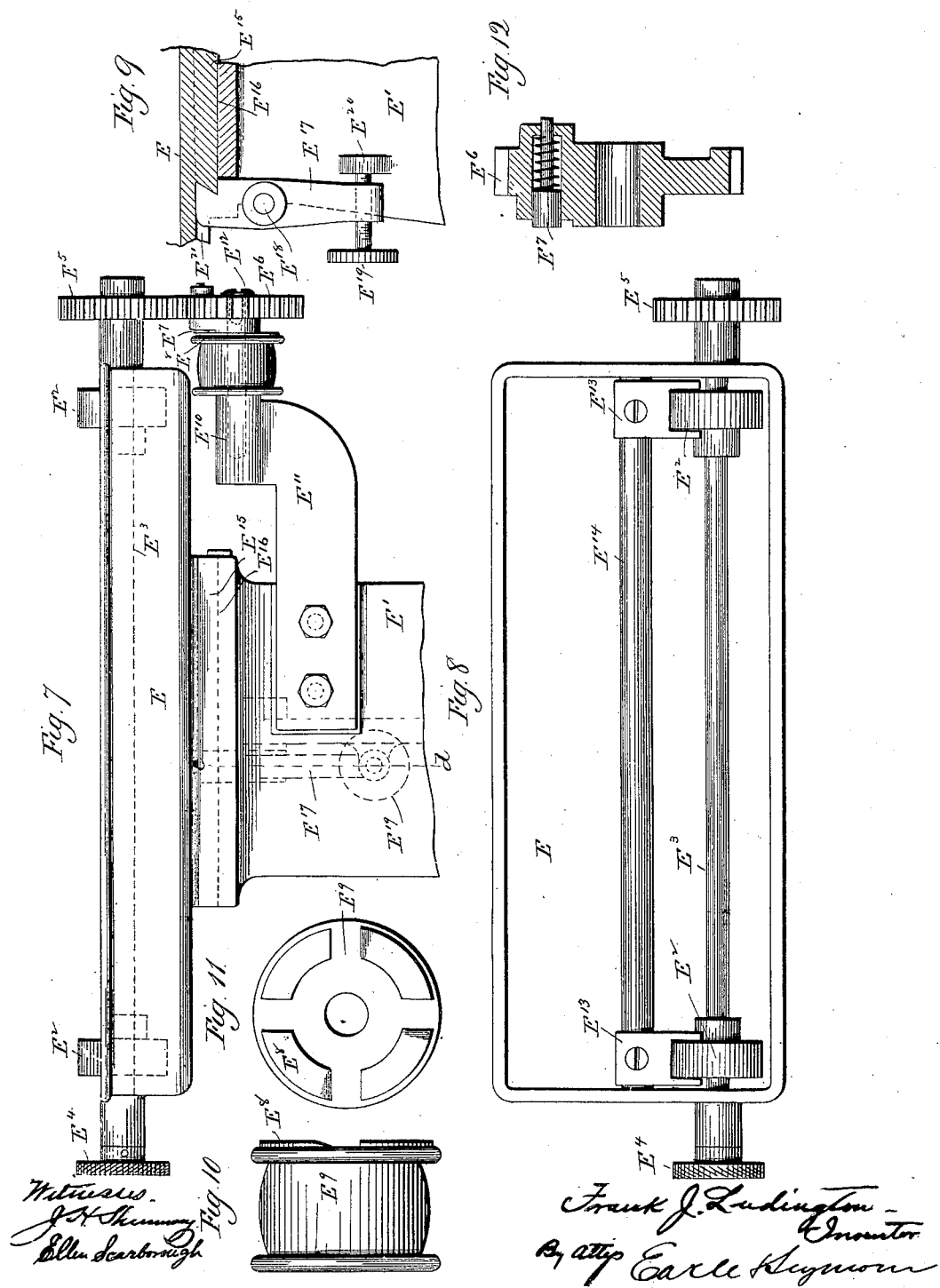

No. 649,327. Patented May 8, 1900.
F. J. LUDINGTON.
MACHINE FOR MAKING CIGARETTE PACKAGES.
(Application filed Apr. 4, 1898.)
(No Model.) 16 Sheets—Sheet 7.
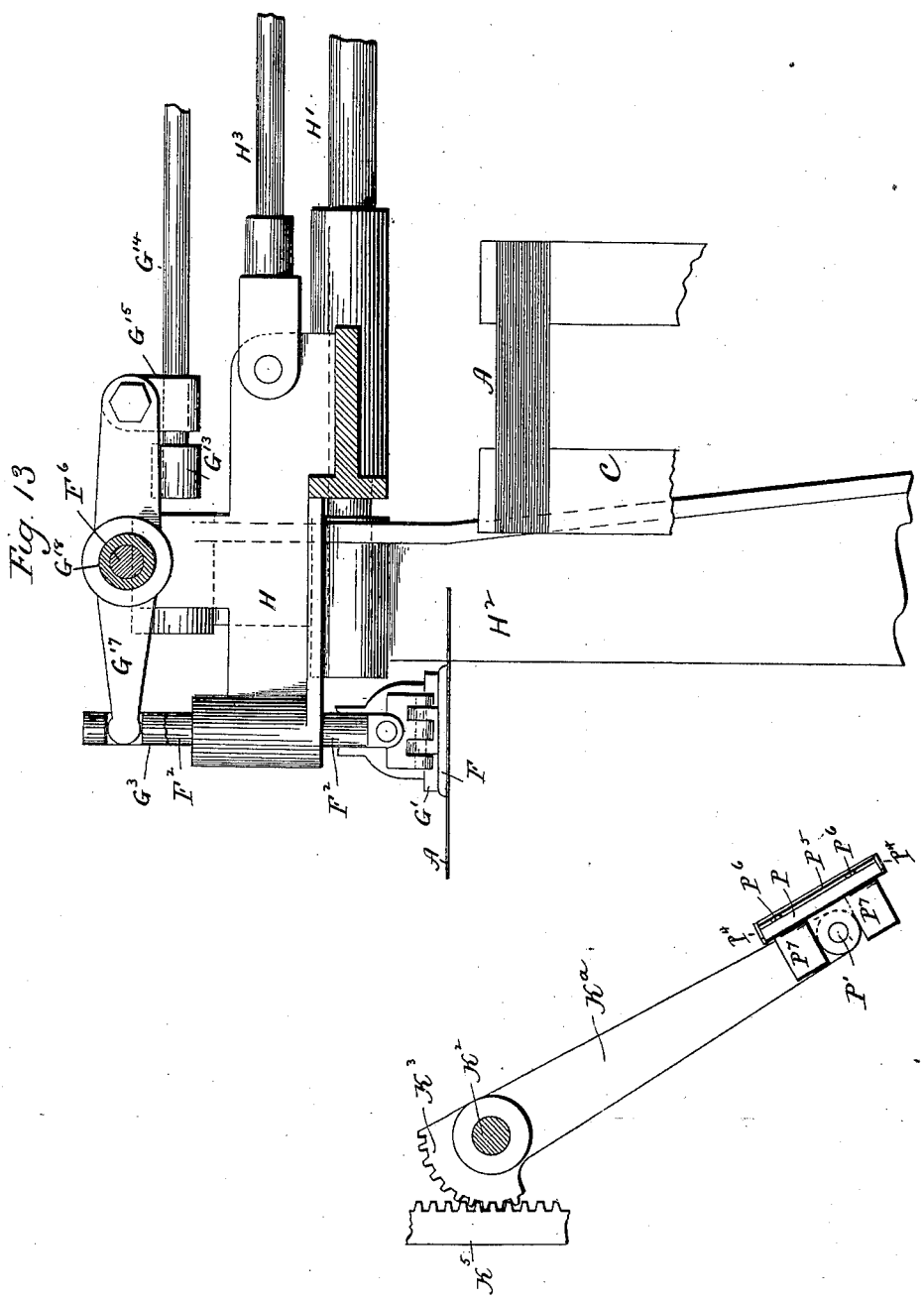

No. 649,327. Patented May 8, 1900.
F. J. LUDINGTON.
MACHINE FOR MAKING CIGARETTE PACKAGES.
(Application filed Apr. 4, 1898.)
(No Model.) 16 Sheets—Sheet 8.
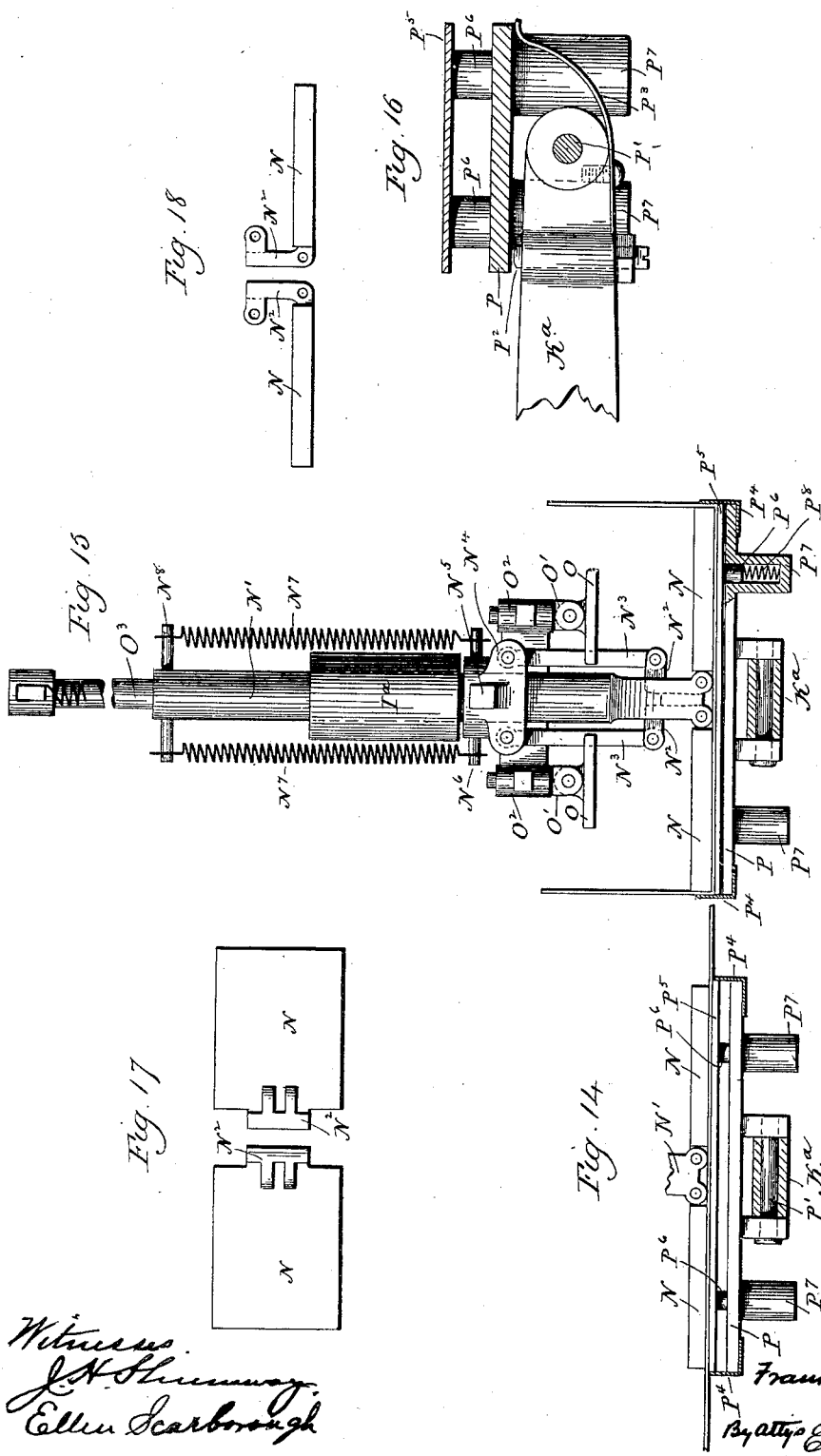

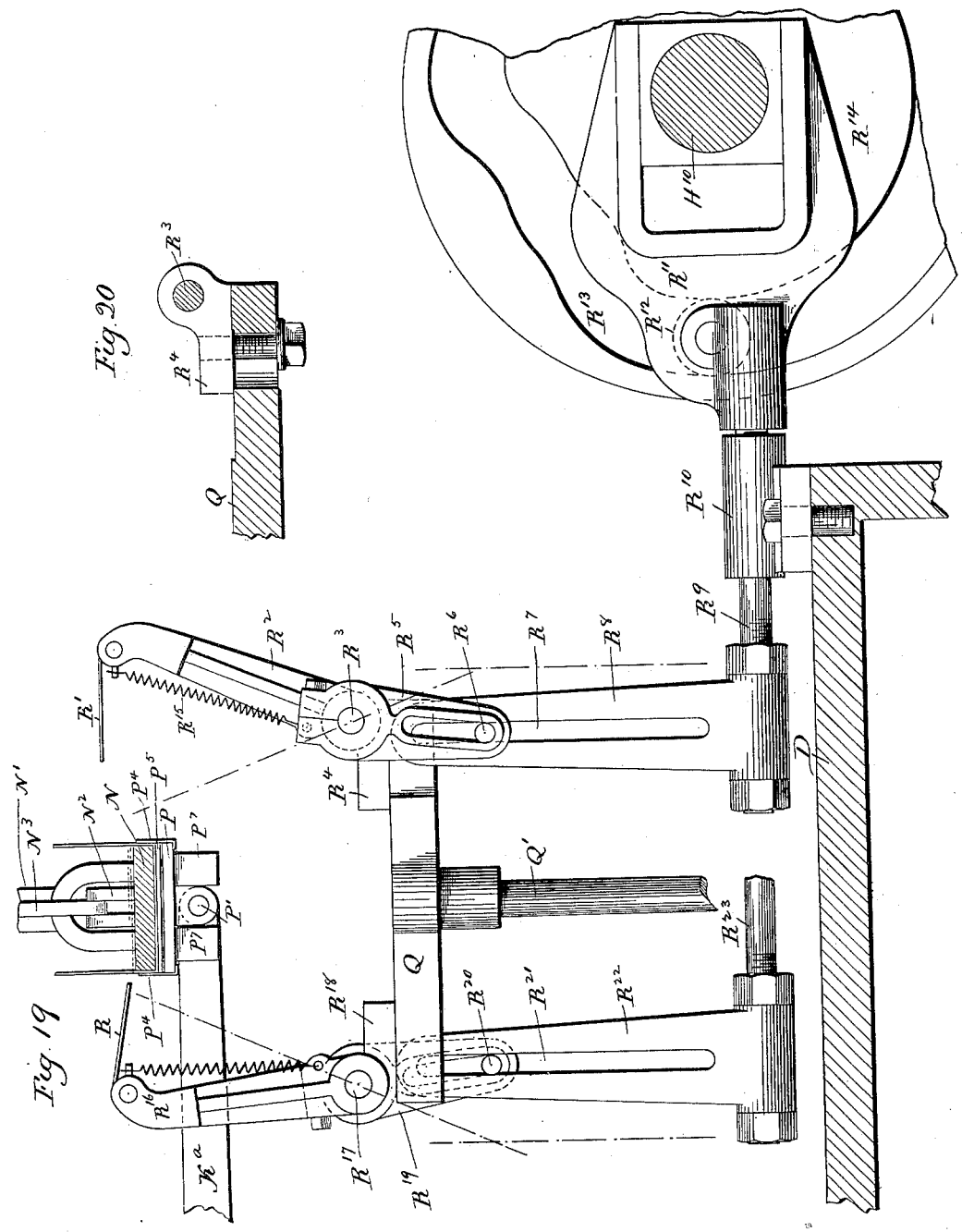

No. 649,327. Patented May 8, 1900.
F. J. LUDINGTON.
MACHINE FOR MAKING CIGARETTE PACKAGES.
(Application filed Apr. 4, 1898.)
(No Model.) 16 Sheets—Sheet 10.
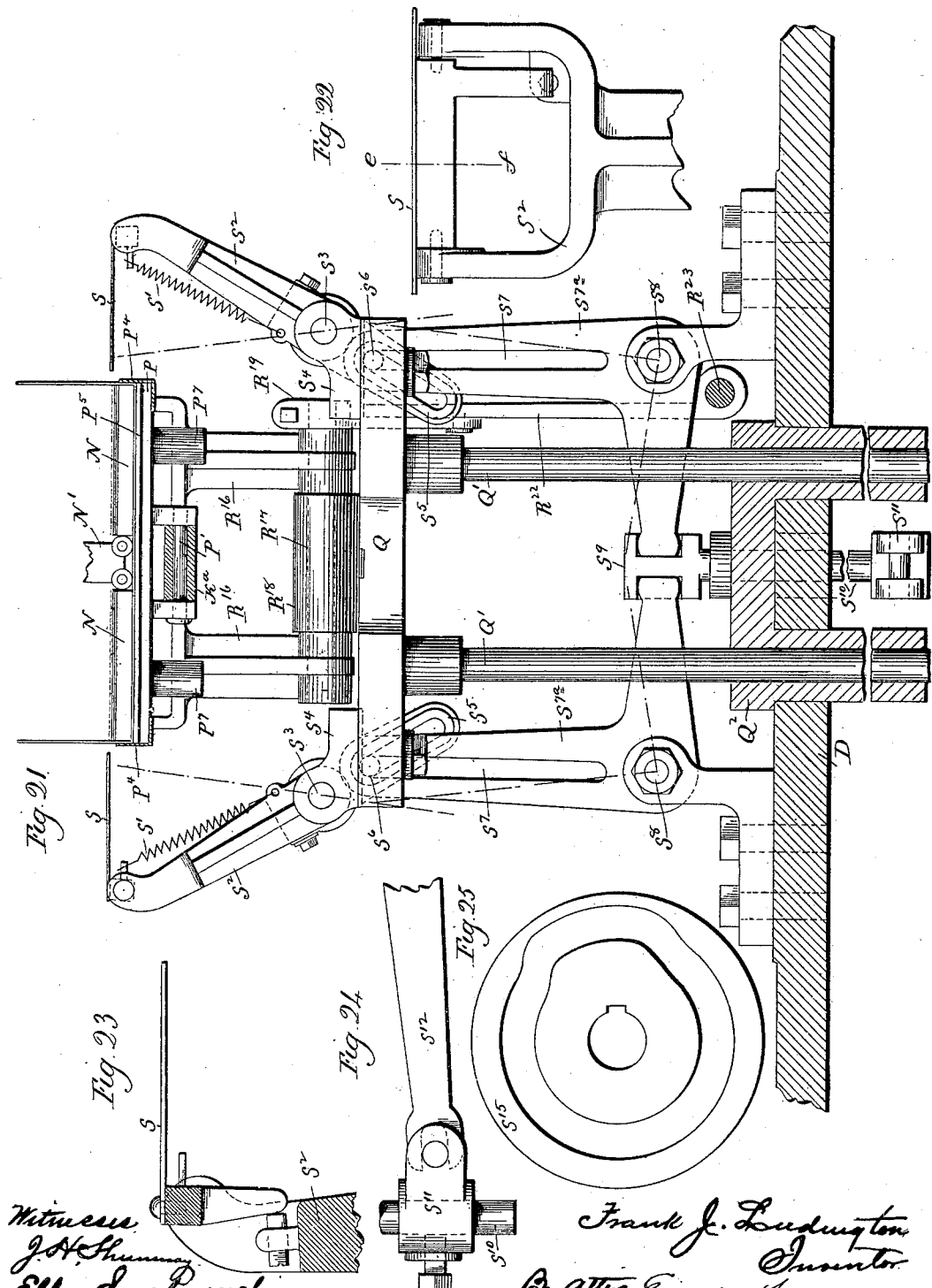

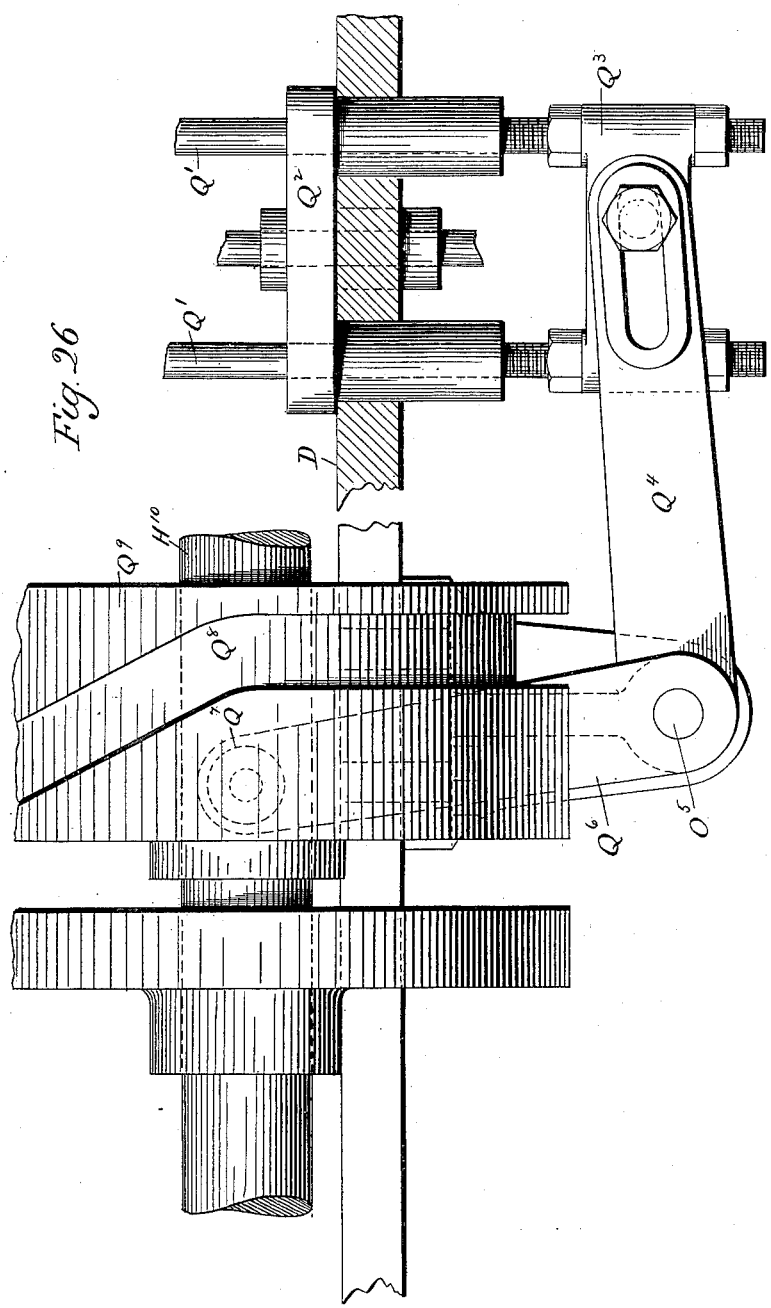

No. 649,327. Patented May 8, 1900.
F. J. LUDINGTON.
MACHINE FOR MAKING CIGARETTE PACKAGES.
(Application filed Apr. 4, 1898.)
(No Model.) 16 Sheets—Sheet 12.
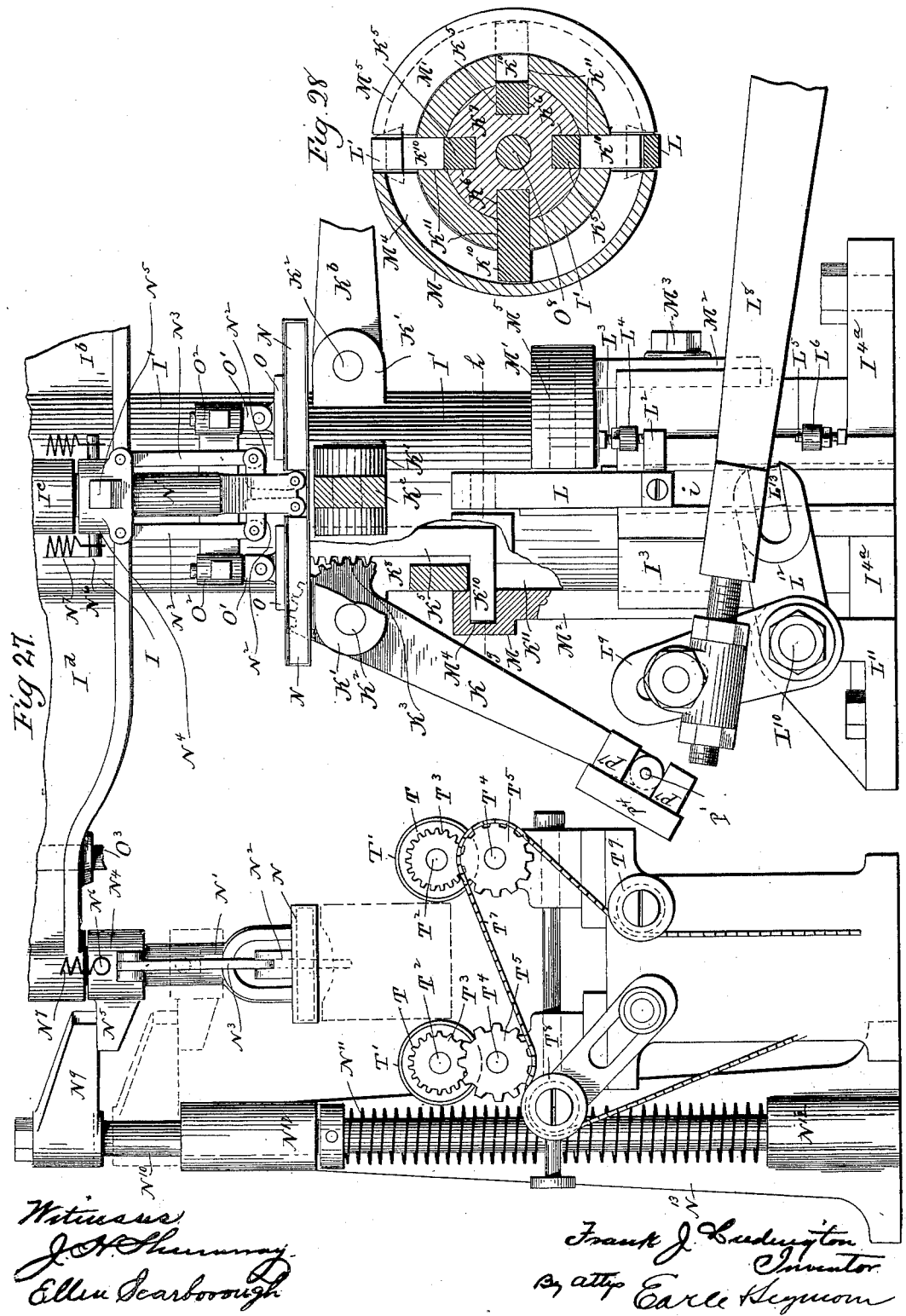

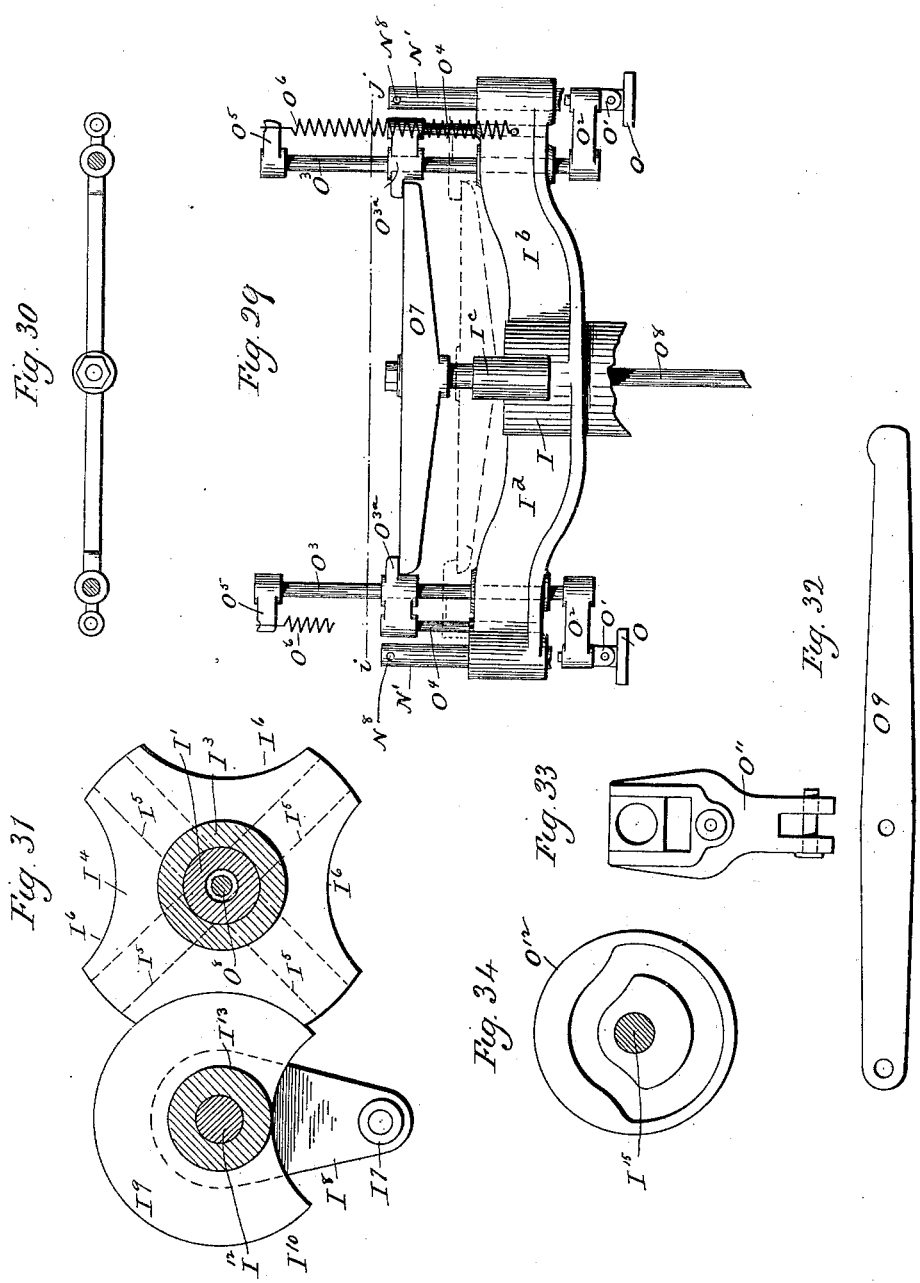

No. 649,327. Patented May 8, 1900.
F. J. LUDINGTON.
MACHINE FOR MAKING CIGARETTE PACKAGES.
(Application filed Apr. 4, 1898.)
(No Model.) 16 Sheets—Sheet 14.
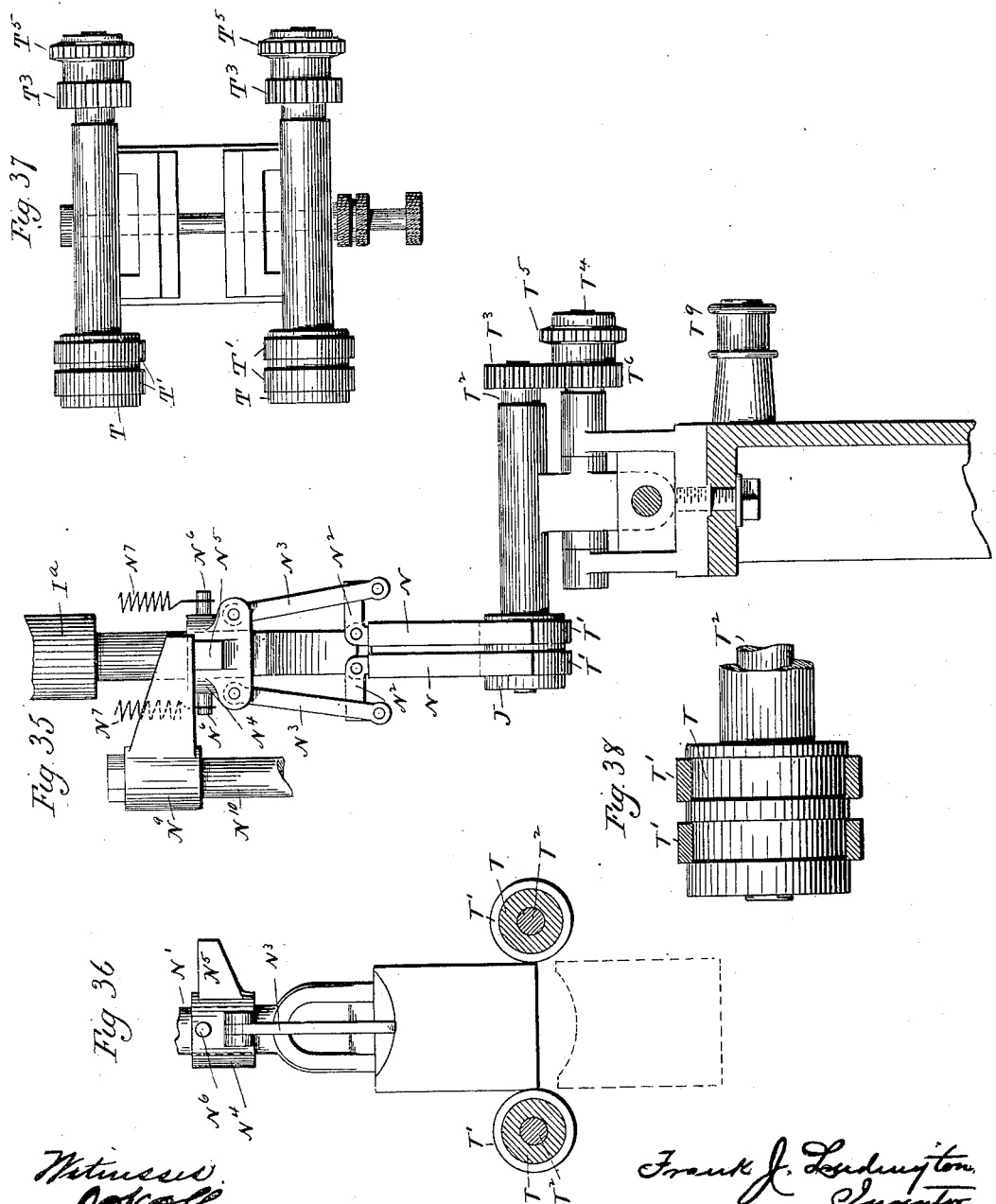

No. 649,327. Patented May 8, 1900.
F. J. LUDINGTON.
MACHINE FOR MAKING CIGARETTE PACKAGES.
(Application filed Apr. 4, 1898.)
(No Model.) 16 Sheets—Sheet 15.

No. 649,327. Patented May 8, 1900.
F. J. LUDINGTON.
MACHINE FOR MAKING CIGARETTE PACKAGES.
(Application filed Apr. 4, 1898.)
(No Model.) 16 Sheets—Sheet 16.
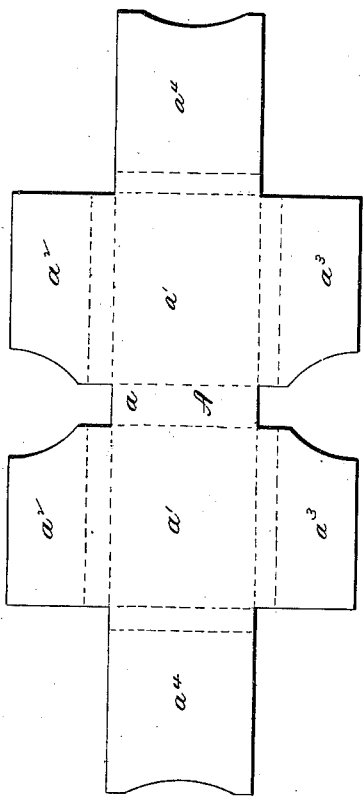
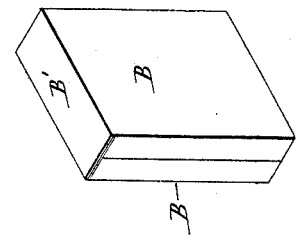
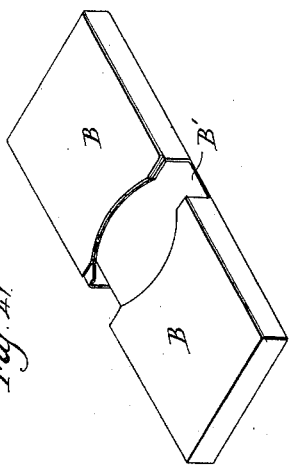

UNITED STATES PATENT OFFICE.

FRANK J. LUDINGTON, OF WATERBURY, CONNECTICUT.

MACHINE FOR MAKING CIGARETTE-PACKAGES.

SPECIFICATION forming part of Letters Patent No. 649,327, dated May 8, 1900.

Application filed April 4, 1898. Serial No. 676,363. (No model.)

*To all whom it may concern:*

Be it known that I, FRANK J. LUDINGTON, of Waterbury, in the county of New Haven and State of Connecticut, have invented a new Improvement in Machines for Making Double-Ended Cigarette-Packages; and I do hereby declare the following, when taken in connection with the accompanying drawings and the letters of reference marked thereon, to be a full, clear, and exact description of the same, and which said drawings constitute part of this specification, and represent, in—

Figure 1, a plan view of one form which my improved machine may assume; Fig. 2, a view thereof in side elevation; Fig. 3, a view thereof in end elevation; Fig. 4, a broken view of the machine in vertical longitudinal section on the line $a\,b$ of Fig. 1; Fig. 5, a detached broken view, partly in front elevation and partly in section, showing the blank gummers and strippers and some of the instrumentalities by which they are operated; Fig. 6, a detail view further showing the instrumentalities for operating the blank-gummers and blank-strippers; Fig. 7, a view in rear elevation of the gum-reservoir, showing the means employed for actuating the gumming-rolls located within it; Fig. 8, a plan view of the gum-reservoir; Fig. 9, a broken view in transverse section through the gum-reservoir on the line $c\,d$ of Fig. 7; Fig. 10, a detached edge view of the pulley employed to drive the gumming-rolls; Fig. 11, a face view of the said pulley, showing its face-teeth; Fig. 12, a sectional view of the driven pinion with which the said pulley coacts through its face-teeth and showing the spring-actuated coupling-pin mounted in the pinion; Fig. 13, a partial broken view, in side elevation, of the blank-gumming, blank-stripping, and blank-delivering instrumentalities, showing a blank in position to be operated upon by one of the initial folders; Fig. 14, a view, partly in section and partly in elevation, of one of the initial folders, which is shown in conjunction with a pair of pivotal dies and with an unfolded blank which is located between them in position to receive its initial folding; Fig. 15, a view, partly in elevation and partly in section, of the said initial folder and pair of pivotal dies, showing the blank after it has received its initial folding and also showing the instrumentalities with which the said dies are organized to constitute one of the four forming mechanisms of the machine; Fig. 16, an enlarged view in transverse section, showing the pivotal connection of one of the initial folders with its rotary and vertically-movable pivotal carrying-arm; Fig. 17, a detached plan view of a pair of the pivotal dies; Fig. 18, a view of the same in side elevation; Fig. 19, a view, partly in section and partly in elevation, of the side-flap folders and the means for operating them; Fig. 20, a broken sectional view showing the means provided for adjusting the said folders; Fig. 21, a view, partly in section and partly in elevation, of the end-flap folders, together with the instrumentalities for operating them; Fig. 22, a broken view, in front elevation, of one of the said folders; Fig. 23, a view thereof in transverse section on the line $e\,f$ of Fig. 22; Fig. 24, a broken view, in side elevation, showing the connection between the end-flap lever and the vertically-movable stem which operates the elbow-levers of the end-flap-folding mechanism; Fig. 25, a detached view of the cam which operates the said lever; Fig. 26, a view showing the instrumentalities employed for lifting the table carrying the side-flap and end-flap folding instrumentalities; Fig. 27, a partial broken view, in vertical section, through the rotating head and designed with particular reference to showing the means employed for vertically operating the pivotal arms carrying the initial folders, the said view also showing one form which the stripping instrumentalities of my machine may assume; Fig. 28, a view on the line $g\,h$ of Fig. 27; Fig. 29, a detached broken view, in side elevation, showing the upper portion of the rotary head and the vertically-movable lifting-bar employed for raising the clamps of the four independently-organized forming mechanisms, two of which are shown in this figure; Fig. 30, a sectional view on the line $i\,j$ of the preceding figure; Fig. 31, a sectional view on the line $k\,l$ of Fig. 4; Fig. 32, a detached view of the lever employed for vertically reciprocating the lifting-bar which operates the clamps; Fig. 33, a detached view of the forked lever connected with the said clamp-operating lever; Fig. 34, a face view of the cam which coacts with the said forked lever in actuating the said clamp-operating lever; Fig. 35, a broken view of one of the forming mechanisms with its dies folded downward into parallel planes preparatory to the stripping of a cigarette-package from them by the stripping instrumentalities, which are also shown in side elevation; Fig. 36, a less-comprehensive side or face view of the same parts, the packet being shown in full lines as upon the dies and in broken lines as stripped therefrom; Fig. 37, a plan view showing both pairs of stripping-rolls; Fig. 38, a sectional view of one pair of the stripping-rolls; Fig. 39, a view, partly in vertical section and partly in elevation, showing the means employed for actuating the pivotal dies in assuming their stripping positions; Fig. 40, a plan view of one of the blanks, on which the gum is represented by areas of stippling; Fig. 41, a perspective view of one of the packages produced by the machine, shown as open or unfolded for the introduction or removal of cigarettes; Fig. 42, a similar view of the package as it appears when closed.

My invention relates to an improvement in machines for automatically producing double-ended cigarette-packages, such as are used principally in the Spanish-American countries, the object being to provide a machine having a large capacity for producing such packages of superior quality.

With these ends in view my invention consists in a machine having certain details of construction and combinations of parts, as will be hereinafter described, and pointed out in the claims.

For convenience and clarity of description I shall describe the several instrumentalities of my improved machine in the order in which they act to produce the packages. Before proceeding, however, to such description I would call attention to Figs. 40 to 42 of the drawings. Fig. 40 shows one of the blanks A, which are cut from suitable paper and fed into the machine, the said blank comprising a hinge $a$, body portions $a'$ $a'$, side flaps $a^2$ $a^2$ and $a^3$ $a^3$, and end flaps $a^4$ $a^4$. In Fig. 41 one of the completed packages is shown as opened for the introduction or removal of the cigarettes. In this figure the package is seen to consist of two pockets B B, united by a hinge B', which is just double the thickness of either pocket and which therefore permits them to be folded together, as shown in Fig. 42, which represents the package closed as for transportation or for use.

In carrying out my invention I provide my improved machine with a suitable hopper C, adapted to receive a vertical column of blanks like the blank A shown in Fig. 40. This hopper is furnished with a follower C', mounted upon the upper end of a follower-rod $C^2$, having bearing in the machine-frame D, and connected at its lower end with an adjustable block $C^3$, carrying two pivotal links $C^4$ $C^4$, which are respectively pivoted to the arms $C^5$ $C^5$ of a head located at the inner end of a handle $C^6$, hung upon a stud $C^7$, mounted in a bracket $C^8$, Fig. 3, depending from the machine-frame D. To the rear of the said hopper I locate a shallow gum-reservoir E, which is in the same horizontal plane as the upper part of the hopper C and supported upon a post E', bolted to the machine-frame D. This reservoir contains two gumming-rolls $E^2$ $E^2$, mounted upon and near the ends of a horizontal shaft $E^3$, journaled in the end walls of the reservoir and near the forward or inner edge thereof, one of the projecting ends of the shaft being provided with a knurled button $E^4$, by means of which the shaft may be turned manually, and the other projecting end of the shaft having mounted upon it a driven pinion $E^5$, which is meshed into by a driving-pinion $E^6$, furnished with an inwardly-projecting spring-pin $E^7$, which coacts with face-teeth $E^8$, formed upon the adjacent outer face of a driving-pulley $E^9$, mounted upon a short shaft $E^{10}$, secured to a bracket $E^{11}$, bolted to the upper end of the post E', all as clearly shown in Fig. 7. The driving-pinion $E^6$ is mounted upon the outer end of the shaft $E^{10}$, to which it is secured by a screw $E^{12}$. Under this construction the shaft $E^3$, and hence the gumming-rolls $E^2$ $E^2$, may be revolved when occasion requires by means of the knurled button $E^4$, in which case the driven pinion $E^5$ will drive the driving-pinion $E^6$, causing the pin $E^7$ to ride out of and snap over the face-teeth $E^8$ of the driving-pulley $E^9$, to which power is communicated by a belt. (Not shown.)

To prevent the gumming-rolls $E^2$ $E^2$ from taking up too much paste, I employ sheet-metal scrapers $E^{13}$ $E^{13}$, mounted upon the ends of a long rock-shaft $E^{14}$, journaled at its ends in the end walls of the gum-reservoir; but any other suitable means may be employed for preventing the gumming-rolls from taking up too much gum.

For securing the reservoir E to the post E' I form the reservoir with a long downwardly-projecting undercut rib or dovetail $E^{15}$ and the upper end of the post E' with a corresponding groove $E^{16}$, in which the dovetail is clamped by means of a vertically-arranged clamping-dog $E^{17}$, hung upon a pivot $E^{18}$ and provided at its lower end with a clamping-screw $E^{19}$, impinged against a lug $E^{20}$, formed upon the post E', as shown in Fig. 7. The upper end of the said dog passes through a slot $E^{21}$, formed in the post and intersecting the undercut groove $E^{16}$, so as to permit the upper end of the said dog to engage directly with the dovetail rib $E^{15}$. However, the reservoir and its various allied features may be changed without departing from my invention.

For gumming the blanks and delivering them to the folding and forming instrumentalities and there stripping them I employ two gummers F F' and two strippers G' G', the said gummers and strippers being moved vertically and horizontally for the discharge of their gumming, delivering, and stripping functions. The said gummers F and F' are pivotally attached to the lower ends of vertically-arranged plungers F² and F³, while the strippers G and G' are formed upon the lower ends of vertically-arranged plungers G² and G³. The said plungers are mounted for vertical movement in a carriage H, which is supported upon two horizontally-arranged rods H' H', upon which it is moved back and forth, and which are themselves supported at their ends in brackets H², bolted to the machine-bed D. By reference to Fig. 5 it will be observed that the gummers are separated from each other, so as to engage with the respective gumming-rolls E² E², and that the strippers G' G' are located in line with but inside of the said gummers. The said carriage H is reciprocated back and forth upon the rods H' by means of two horizontal rods H³ H³, pivotally connected at their forward or inner ends with the opposite ends of the carriage and having their rear or outer ends connected with vertically-arranged carriage-levers H⁴ H⁴, mounted by their lower ends upon a carriage rock-shaft H⁵, provided at one end with an upright arm H⁶, carrying an antifriction-roll H⁷, which travels in a cam-groove H⁸, formed in a carriage-operating cam H⁹, mounted upon the cam-shaft H¹⁰. It will be understood that the cam-groove H⁸ just mentioned is adapted to cause the carriage H to be moved horizontally rearward to bring the gummers into contact with the gumming-rolls and then to move the carriage forward over the hopper, where it stops while the gummed gummers pick up a blank, after which it moves still farther forward for the delivery of the gummed blank to the folding and forming instrumentalities.

For the vertical operation of the gummers F and F', I employ two gummer-levers F⁴ and F⁵, flexibly connected, respectively, with the upper ends of the plungers F² and F³ and rigidly secured to a horizontal rock-shaft F⁶, mounted in the upper portion of the carriage H. The said lever F⁴ has a rearward extension carrying a transversely-arranged coupling-stud F⁷, arranged to enter and slide back and forth in a coupling-block F⁸, itself mounted for rocking and sliding back and forth upon a vertically-swinging operating-rod F⁹, secured at its ends to the inner ends of two rock-arms F¹⁰, rigidly secured at their outer ends to a horizontally-arranged rock-shaft F¹¹, journaled in the uprights H² of the machine-frame. The said rock-shaft F¹¹ carries an arm F¹³, Fig. 1, which is pivotally connected with the upper end of a forked lever F¹⁴, carrying a friction-roll F¹⁵, traveling in a cam-groove formed in the face of a gummer-operating cam F¹⁶, mounted on the cam-shaft H¹⁰. For the required vertical movement of the strippers G' G', I employ a stripper-operating cam G⁴, mounted upon the said cam-shaft H¹⁰ and formed with a cam-groove which receives an antifriction-roll G⁵, mounted upon a forked lever G⁶, the upper end of which is connected with one arm of a bell-crank lever G⁷, loosely mounted upon the rock-shaft F¹¹ and having its other arm pivotally connected with a horizontally-arranged coupling-rod G⁸, the opposite end of which is pivotally connected with the upper end of an upright arm G¹⁰, rigidly secured at its lower end to a horizontally-arranged rock-shaft G¹¹, corresponding to the rock-shaft F¹¹, before mentioned, and journaled at its ends in the other two uprights H² of the machine-frame. The said shaft G¹¹ is furnished at its ends with inwardly-extending rock-arms G¹³ G¹³, the inner ends of which carry a vertically-swinging operating-rod G¹⁴, corresponding to the rod F⁹, before mentioned, and passing through a coupling-block G¹⁵, which is free both to rock and to slide upon it. The said coupling-block receives a horizontal sliding coupling-stud G¹⁶, transversely mounted in the rear end of a stripper-lever G¹⁷, which at its forward end engages with the upper end of the stripper-plunger G³ and which is mounted upon a rock-sleeve G¹⁸, through which the rock-shaft F⁶, before mentioned, passes. The opposite end of the said sleeve is provided with a short stripper-lever G¹⁹, which engages with the upper end of the stripper-plunger G². Under the construction described the sliding coupling-blocks F⁸ and G¹⁵ are permitted to slide back and forth with the reciprocating movement of the carriage H upon the operating-rods F⁹ and G¹⁴, which are simultaneously swung up and down by the shafts F¹¹ and G¹¹, which are rocked by the instrumentalities connecting them with the cams F¹⁶ and G⁴, the cam-grooves of which are constructed to cause the gummers F F' to be engaged with the gumming-rolls E² E² when the carriage is at the limit of its rearward movement, and then to descend into the hopper C when the carriage H moves over the same, then to rise with a blank, and then to move inward to deliver the gummed blank to the folding and forming instrumentalities when the gummers are lifted in advance of the strippers, which then strip the gummed blanks from the gummers.

I may here point out that the cam-grooves of the cams G⁴ and F¹⁶ are formed so that in being lifted out of the hopper the gummers will start a little before the strippers, so that the ends of the blanks will be lifted before their central portions. Air is thus let in under the ends of the blanks, which are thus prevented from being picked up more than one at a time under the influence of that suction so often present between sheets of paper. I also wish to point out in this connection that the gummed blanks are delivered sidewise and not endwise to the folding and forming instrumentalities of the machine, whereby a great economy of space is secured.

The folding and forming instrumentalities of my machine in part comprise a four-armed intermittently-rotated head I, having arms Iᵃ, Iᵇ, Iᶜ, and Iᵈ, located in a horizontal plane and made integral with the upper end of a long hollow shaft I', formed with a bearing-shoulder $I^2$, which rides, as the shaft is turned, upon the upper end of a supporting-sleeve $I^3$, extending downward through the bed D of the machine and formed with flanges $14^a$, Fig. 27, by means of which it is bolted to the upper face of the said bed. A star-like driving-wheel $I^4$, Fig. 31, splined to the projecting lower end of the shaft I', has four radial slots $I^5$, located at right angles to each other, and four concave locking-surfaces $I^6$, located between the said slots. The said slots receive an antifriction-roll $I^7$, mounted upon a horizontal arm $I^8$, rigidly connected with a locking-wheel $I^9$, corresponding in curvature to the curvature of the locking-recesses $I^6$ of the star-like wheel $I^4$ and having a clearance-recess $I^{10}$. The said locking-wheel is splined upon the hub of a bevel-pinion $I^{11}$, which turns upon and is supported by a depending stud $I^{12}$, bolted to the machine-bed D, which is formed with a heavy bearing $I^{13}$ for the reception of the upper end of the stud. The beveled pinion $I^{11}$ meshes into a correspoding pinion $I^{14}$, mounted upon a short horizontal shaft $I^{15}$, mounted below the machine-bed in suitable bearings depending therefrom and provided at its opposite end with a gear-wheel $I^{16}$, meshing into a gear-wheel $I^{17}$, Fig. 3, which in turn meshes into a gear-wheel $I^{18}$, meshing into a gear-wheel $I^{19}$, mounted upon the cam-shaft $H^{10}$, which carries a gear-wheel $I^{20}$, which meshes into a pinion $I^{21}$, mounted upon the short main shaft J, which is furnished with a driving-pulley J' and an idle pulley $J^2$, as seen in Fig. 2. As the arm $I^8$ is rotated its antifriction-roll $I^7$ enters one of the slots $I^5$ of the star-like wheel $I^4$ and imparts a quarter-turn to the said wheel, whereby the shaft I' and four-armed head I are turned through an arc of ninety degrees. During the first half of the action of the roll $I^7$ upon the star-wheel $I^4$ it enters one of the slots $I^5$ thereof, and during the last half of its action it emerges from the said slot. Just as it emerges from the said slot the unbroken surface of the locking-wheel $I^9$ enters the then adjacent locking-recess $I^6$ of the star-wheel, which is thus held against rotation, whereby the shaft I' and head I are also held until the locking-wheel has completed its rotation and brought its clearance-space $I^{10}$ again into range with one of the arms of the star-wheel. The arm $I^8$ is then in position to enter its antifriction-roll $I^7$ into the next slot $I^5$ of the star-wheel, and so on, whereby the intermittently-rotating head I is intermittently moved through an arc of ninety degrees and firmly locked between each of its movements.

Four vertically-movable initial-folder-carrying arms K $K^a$ $K^b$ $K^c$ are pivotally connected at their inner ends with outwardly-projecting lugs K', formed integral with the hollow shaft I', toward the upper end thereof, these lugs being located at equal distances apart and carrying heavy pins $K^2$, upon which the said carrying-arms swing. The inner ends of the said arms are formed with segmental pinions $K^3$, which respectively mesh into four independently-operated vertically-movable racks $K^5$, located in long vertical slots $K^6$, formed in a sleeve $K^7$, situated within the upper end of the hollow shaft I', which is formed with four vertical slots $K^8$ equally separated from each other and permitting the pinions $K^3$ to be engaged with the racks $K^5$, by means of which the arms K are positively raised and lowered. At its lower end the sleeve $K^7$ rests upon a shoulder $K^9$, formed within the hollow shaft I', with which the sleeve rotates. The lower end of each of the racks $K^5$ is formed with an outwardly-projecting operating-arm $K^{10}$, the said arms projecting through vertical slots $K^{11}$, Fig. 27, formed in the hollow shaft I', at points below the lugs K' thereof. Owing to the rotation of the said racks with the sleeve $K^2$, shaft I', and head I, the outer ends of the said arms $K^{10}$ of the racks are alternately entered into open slots formed in the upper ends of two vertically-arranged operating-slides L and L', which are of dovetail form in cross-section and play up and down in vertically-arranged dovetail grooves $i$, formed in the supporting-sleeve $I^3$. In Fig. 27 the slide L is shown as being provided with a stop-arm $L^2$, which engages when the slide is lifted with a stop-screw $L^3$, mounted in a lug $L^4$, and when the slide has reached the limit of its downward movement with a stop-screw $L^5$, mounted in a lug $L^6$. A similar stop-arm engaging with similarly-mounted stop-screws is provided for the operating-slide L', but not shown. The slide L is actuated in vertical reciprocation by means of a slide-operating cam $L^7$, mounted upon the cam-shaft $H^{10}$ and operating a long lever $L^8$, the inner end of which is pivotally and adjustably connected with an arm $L^9$, secured to a shaft $L^{10}$, journaled in a bracket $L^{11}$ and carrying an arm $L^{12}$, having its outer end slotted for the reception of a coupling-block $L^{13}$, mounted upon the lower end of the slide. The slide L' is vertically reciprocated by means of a slide-operating cam $L^{14}$, mounted upon the cam-shaft $H^{10}$ and actuating a long lever $L^{15}$, the inner end of which is connected with the slide L' in the same manner that the lever $L^8$ is connected with the slide L. These slides play up and down between the ends of two segmental controllers M and M', respectively located in different horizontal planes and each having a depending arm $M^2$, by means of which it is secured by a bolt $M^3$ to the exterior face of the supporting-sleeve $I^3$. The controller M is formed in its inner face with a groove $M^4$, extending throughout its length and open at its ends, while the controller M' is formed in its inner face with a corresponding groove $M^5$, extending throughout its length and open at its ends, the said grooves $M^4$ and $M^5$ corresponding in cross-sectional form to the grooves formed in the inner faces of the upper ends of the slides L and L' and adapted to receive the projecting outer ends of the arms $K^{10}$ of the racks $K^5$.

In the operation of the machine the arms K, $K^a$, $K^b$, and $K^c$ are positively raised and lowered by their respective racks $K^5$ and positively held in their raised or lowered positions by means of the segmental controllers M and M'. The operating-slides L and L' coact with the racks $K^5$ to lift the same so as to bring their arms $K^{10}$ into position for entrance into the groove $M^4$ of the upper controlling-segment M or pull them down for entrance into the groove $M^5$ of the lower controlling-segment M'. Thus just as one of the said carrying-arms comes into position, as shown in Fig. 13, to be lifted for the initial folding of a blank the outwardly-projecting operating-arm $K^{10}$ of the rack $K^5$, coacting with the said carrying-arm, issues from the groove $M^4$ of the upper controlling-segment M and enters the groove in the upper end of the operating-slide L', which is then immediately drawn downward, with the effect of drawing the rack downward, whereby the carrying-arm is lifted into its operating position. By the time the said operating-slide has reached the limit of its downward movement it has brought the operating-arm $K^{10}$ of the rack into line with the adjacent open end of the groove $M^5$, formed in the lower segmental controller M'. The revolution of the head I and its shaft I' now causes the operating-arm $K^{10}$ to enter the said groove, in which it travels until the carrying-arm has swung through an arc of one hundred and eighty degrees, during which it is maintained in its elevated position. After the carrying-arm has moved through an arc of one hundred and eighty degrees, as described, the operating-arm $K^{10}$ of its rack emerges from the other end of the groove $M^5$ of the segmental controller M' and enters the groove formed in the upper end of the then depressed operating-slide L, which immediately lifts the rack, whereby the carrying-arm is thrown down into its depressed position. When the said rack reaches the limit of its upward movement, its operating-arm $K^{10}$ is brought into line with the adjacent open end of the groove $M^4$, formed in the upper segmental controller M. The said operating-arm $K^{10}$ then immediately enters this groove, in which it travels until the carrying-arm has moved through an arc of one hundred and eighty degrees, during which time the said carrying-arm will thus be positively held in in its depressed position. At the end of this time the arm $K^{10}$ will again ride out of the other end of the groove $M^4$ in the segmental controller M and into the now elevated slide L', which will immediately act to draw the rack down, so as to again lift the carrying-arm, and so on. The carrying-arms are thus successively raised and positively supported in elevated positions until they have done their work, after which they are retired and positively held in their retired positions during their periods of retirement, two out of the four carrying-arms always being elevated and two depressed.

The packages are formed by folding the blanks upon a former, which is perhaps the most distinctive feature of my improved machine and which comprises a pair of corresponding dies N N, which are maintained in a horizontal plane during the formation of the packages, but which are folded together, as it were, into parallel vertical planes for the stripping of the packages. In the machine shown I employ four pairs of these dies, one pair each in the four independently-organized forming mechanisms located at the outer ends of the four arms $I^a$, $I^b$, $I^c$, and $I^d$ of the four-armed intermittently-revolving head I. As the said mechanisms are duplicates of each other it will be sufficient for me to describe one of them chosen for that purpose—the mechanism carried by the arm $I^a$. The dies N N of this mechanism are pivoted by their inner ends to the lower ends of a vertically-arranged die carrier or stem N', mounted in the outer end of the said arm $I^a$. The inner ends of the respective dies are provided with integral bell-crank levers $N^2$, the terminals of which extend in opposite directions and are pivotally connected with the lower ends of operating-links $N^3$, which are pivotally connected at their upper ends with a sliding operating-block $N^4$, mounted upon the stem N', formed with a lug $N^5$ and provided with a transverse pin $N^6$, the projecting opposite ends of which form points for the attachment of two corresponding springs $N^7$ $N^7$, the upper ends of which are connected with the ends of a similar pin $N^8$, which is passed through the upper end of the stem N'. These springs, it will be understood, exert a constant effort to hold the dies in their horizontal or forming positions in which they are shown in Figs. 14 and 15.

For turning the dies down into their folded or stripping positions in which they are shown in Figs. 25, 35, and 36 I employ a stripping-dog $N^9$, located at the upper end of a stripping-rod $N^{10}$, normally maintained in an elevated position by a spring $N^{11}$, encircling and supported in the brackets $N^{12}$ $N^{12}$ of a post $N^{13}$, bolted to the bed of the machine. The lower end of the said rod projects downward through the said post and is connected with a lever $N^{14}$, mounted on a short shaft $N^{15}$, carrying an arm $N^{16}$, to which is attached one end of a long horizontal rod $N^{17}$, the opposite end of which is secured to a lever $N^{18}$, suspended in a bracket $N^{19}$, and at its upper end carrying an antifriction-roll $N^{20}$, coacting with the former-folding cam $N^{21}$, which is mounted upon the cam-shaft $H^{10}$.

On either side of the lower end of the stem N' and just above the respective dies N N, I locate two corresponding clamps O O, Fig. 15, which are pivotally secured to vertically-movable clamp-holders O' O', adjustably mounted in the opposite ends of a cross-head O², which is attached to the lower end of a vertically-movable suspension-rod O³, journaled in the outer end of the arm I^a and provided with an operating-block O^{3a}, rigidly secured to it, the said block being furnished with a guide-pin O⁴, entering the arm I^a, whereby the rod O³ is prevented from turning on its longitudinal axis. At its extreme upper end the said rod O³ is formed with a finger O⁵ for the attachment of the upper end of a spring O⁶, the lower end of which is connected with the arm I^a and which exerts a constant effort to pull the rod downward, and hence move the clamps downward into action. The clamps O O are lifted into their retired positions by means of a two-armed clamp-lifting bar O⁷, rigidly secured to the upper end of a vertically-movable lifting-rod O⁸, which passes downward through the long shaft I' of the rotary head I, which rotates under the bar O⁷. The lower end of the said rod O⁸ is connected with a lever O⁹, Figs. 2 and 4, suspended below the machine from a bracket O¹⁰ and carrying a forked lever O¹¹, which coacts with a cam O¹², mounted upon the short shaft I¹⁵. The lifting-bar O⁷ being a two-armed bar simultaneously operates the clamps of two of the four forming mechanisms, respectively, organized in the ends of the arms of the rotatable head I, as will be described later on.

Returning now to the folder-carrying arms, each of them is provided with an initial folder, of which there are therefore four in number; but as they are duplicates of each other it will suffice to describe one and that the one mounted upon the carrying-arm K. This initial folder comprises a rectangular plate P, which substantially conforms in size not to a package-blank, but to a completed package when open, as shown in Fig. 41, this plate being formed with a depending lug, by means of which it is connected by a pivot P' with the outer end of the said carrying-arm K. For insuring the right presentation of the folder to the gummed blanks the folder is pivotally secured, as described, to the carrying-arm and adjusted by a stop-screw P² and yieldingly supported by a spring P³, which controls the rocking movement of the folder upon the pivot P'. To the edges of the plate P are secured angled sheet-metal initial-folding plates P⁴, which project above the surface of the plate to a distance substantially representing the thickness of the pivotal dies N N. Within the shallow space inclosed by the initial-folding plates P⁴, I locate a thin platen P⁵, fitting within the said space and supported by two pins P⁶ P⁶, which enter sockets P⁷ P⁷, formed to receive them, and also containing springs P⁸ P⁸, which exert a constant effort through the said pins to lift the platen to the top of the recess inclosed by the said initial-folding plates P⁴, as shown in Fig. 14. It should also be explained at this point that the initial folders are mounted transversely or crosswise upon the ends of the carrying-arms, so as to receive the gummed blanks sidewise from the blank-gumming and blank-delivering instrumentalities of the machine, and for the same reason the dies N N of the several forming mechanisms are correspondingly arranged or crosswise with respect to the arms of the rotatable four-armed head I.

It may now be explained that at or about the time the rotary head I presents one of the former mechanisms carried by one of its arms to the delivery-point of the blank-gumming and blank-delivering mechanism that mechanism operates to deliver a gummed blank just under the dies N N of the forming mechanism. One of the carrying-arms is now lifted, whereby the platen P⁵ of the initial folder carried by it is brought into engagement with the lower face of the central portion of the blank, which it presses firmly against the now open or horizontally-arranged pivotal dies. The carrying-arm continuing to be lifted, the initial-folding plates P⁴ of the initial former effect the initial folding of the blank, as shown in Fig. 15, the side flaps $a^2$ $a^2$ and $a^3$ $a^3$ and the end flaps $a^4$ $a^4$ being raised at a right angle to the body portions $a'$ $a'$ of the blank. During this operation the platen retires within the initial-folding plates P⁴, though in reality they move up over it, as the platen is prevented from moving by its engagement with the blank, which is in turn pressed with the pivotal dies N N. As soon as the blank has been initially folded the rotatable head is moved for a quarter-turn, thus bringing the forming mechanism of the next succeeding arm into position for coaction with the initial folder carried by the next succeeding carrying-arm and bringing the forming mechanism and initial folder, which have just folded a blank, into position for coaction with the side-flap-folding and end-flap-folding instrumentalities.

The instrumentalities just mentioned are mounted upon a vertically-movable horizontal table Q, supported upon two vertically-movable rods Q' Q', mounted in suitable bearings Q², connected with the machine-bed D and having their projecting lower ends attached to an adjustable crosshead Q³, adjustably connected with a table-lifting lever Q⁴, secured to a rock-shaft Q⁵, also having rigidly secured to it a lever Q⁶, carrying an antifriction-roll Q⁷, running in a cam-groove Q⁸, formed in a table-operating cam Q⁹, mounted upon the cam-shaft H¹⁰, the said cam-groove being formed so as to lower the table before the coacting forming mechanisms and initial folders are moved into a position above it, after which it is lifted also by the action of the said cam. The said table Q is furnished with two pairs of side-flap folders which fold the side flaps $a^2$ $a^2$ and the side flaps $a^3$ $a^3$ and with two end-flap folders which fold the end flaps $a^4$ $a^4$. For a clear illustration of these flaps see Fig. 40. The inner side flaps $a^2$ $a^2$ are folded first by the inner pair of side-flap folders R, which are followed by the outer pair of side-flap folders R', which then fold the outer side flaps $a^3$ $a^3$. The said outer side-flap folders R' consist of thin flat plates pivotally mounted in the upper ends of rock-arms $R^2$ $R^2$, secured to a rock-shaft $R^3$, journaled in a horizontally-adjustable bearing $R^4$, mounted upon the table Q, as seen in Fig. 20. One end of the said shaft $R^3$ is connected with a lever $R^5$, carrying at its lower end an adjustable pin $R^6$, traveling in a long vertically-arranged slot $R^7$, formed in the vertically-arranged horizontally-movable operating-arm $R^8$, which is secured to and supported by one end of a reciprocating rod $R^9$, mounted in a bearing $R^{10}$, and forming a part of a forked lever $R^{11}$, which embraces the cam-shaft $H^{10}$, and which carries an antifriction-roll $R^{12}$, traveling in a cam-groove $R^{13}$, formed in the outer side-flap cam $R^{14}$, which is mounted upon the cam-shaft $H^{10}$. Springs $R^{15}$, secured to the folders $R^{11}$, control the same, but permit them to yield. The inner side-flap folders R are mounted in the upper ends of rock-arms $R^{16}$ $R^{16}$, secured to a shaft $R^{17}$, mounted in an adjustable bearing $R^{18}$, and also carrying a lever $R^{19}$, furnished with an adjustable pin $R^{20}$, entering a vertical slot $R^{21}$, formed in a vertically-arranged horizontally-movable lever $R^{22}$, secured to and supported by a reciprocating rod $R^{23}$, connected with and operated by an inner side-flap cam $R^{24}$, mounted upon the shaft $H^{10}$, the connection of the rod $R^{23}$ with the cam $R^{24}$ not being shown, but corresponding to the connection of the rod $R^9$ with the cam $R^{14}$, which is clearly shown.

The end flaps $a^4$ $a^4$, Fig. 40, of the blank are folded inward after the side flaps have been folded by means of the end-flap folders S S, which consist of sheet-metal plates controlled by spiral springs S' S' and pivotally mounted in the upper ends of rock-arms $S^2$ $S^2$, secured to shafts $S^3$ $S^3$, journaled in bearings $S^4$ $S^4$, adjustably mounted in the table Q. To the said shafts $S^3$ $S^3$ are secured levers $S^5$ $S^5$, having their lower ends slotted for the reception of pins $S^6$ $S^6$, made adjustable in the slots in any approved manner and entering vertical slots $S^7$ $S^7$, formed in the upper arms of the bell-crank levers $S^{7a}$ $S^{7a}$, hung upon studs $S^8$ $S^8$, and having their lower arms flexibly connected with a vertically-movable head $S^9$, having a downwardly-projecting stem $S^{10}$, the projecting lower end of which carries an adjustable coupling-block $S^{11}$, connected with a long lever $S^{12}$, which is operated by means of the end-flap-folding cam $S^{15}$, mounted on the cam-shaft $H^{10}$, as seen in Fig. 1. Just as soon as the end-folders have performed their work and retired the cam $Q^{12}$ operates to permit the clamps O O to descend upon the folded blank, so as to prevent it from unfolding and so as to press the gummed areas of its end flaps firmly down upon the ungummed areas of its outer side flaps. The blank having now been folded upon the dies and clamped against the unfolding of its flaps the table Q is retired by the table-operating cam $Q^9$, so as to get the upwardly-projecting rock-arms $R^2$ $R^2$, $R^{16}$ $R^{16}$, and $S^2$ $S^2$ out of the path of the forming mechanism and initial folder with which the flap-folding mechanism has coacted. The rotatable head is now moved a quarter-turn; but in this next or third position nothing is done to the folded blank. The next quarter-turn of the rotatable head brings the folded package into position for being stripped. As it moves into this position the block $O^8$ of the rod $N^3$ is brought into position for being lifted by the arm $o'$ of the lifting-bar $O^7$, which is now lifted for retiring the clamps O O, the other arm $o$ of the bar $O^7$ lifting the clamps of the opposite forming mechanism into correspondingly-retired positions. The die-folding cam $N^{21}$ now operates to draw the rod $N^{10}$ downward, whereby the dog N is pressed downward upon the projection $N^5$, whereby the sleeve $N^4$ is drawn downward against the tension of the springs $N^7$ $N^7$ and the pivotal arms turned into their folded positions, in which they are clearly shown in Fig. 35, whereby the package upon the pivotal dies is also folded into position for being stripped therefrom. When the dies are thus turned into their folded positions, the folded package upon them is brought into contact with two pairs of stripping-rolls T, Fig. 37, which are preferably faced with rubber bands T', as shown in Fig. 38. These rolls are mounted upon shafts $T^2$ $T^2$, carrying pinions $T^3$ $T^3$. Sprocket-wheel shafts $T^4$ $T^4$, located below the shafts $T^2$ $T^2$, carry sprocket-wheels $T^5$ $T^5$, the shafts $T^2$ being driven from the sprocket-wheel shafts, as shown in Fig. 35, and meshing into the pinions $T^3$, mounted upon the stripping-roll shafts, as shown in Fig. 37. The sprocket-wheel shafts are driven in opposite directions or toward each other by means of a sprocket-chain $T^7$, passing over two idlers $T^8$ $T^9$, of which the latter is adjustable for taking up slack, and also passing over a sprocket-wheel $T^{10}$, mounted on a long shaft $T^{11}$, carrying at its outer end a sprocket-wheel $T^{12}$, driven by a sprocket-chain $T^{13}$, Fig. 3, passing over a sprocket-wheel $T^{14}$, mounted upon the shaft $I^{15}$.

I may here mention that the stripping-rolls may be replaced by any other suitable stripping instrumentalities.

It will be understood, of course, that for every movement of the rotatable head a gummed blank is presented, seized, and initially folded, while a previously completely folded blank is stripped, so that initial folding, final folding, and stripping take place simultaneously at three different points, whereby the machine is given a very great capacity for the production of packages.

In view of the modifications suggested and of others which may obviously be made I would have it understood that I do not limit myself to the exact construction shown and described, but hold myself at liberty to make such changes as fairly fall within the spirit and scope of my invention. In particular the means shown and described for imparting their appropriate movements to the gumming, delivering, folding, and stripping instrumentalities may be widely varied in character and arrangement without departing from my invention.

I have spoken of the machine as designed for the production of double-ended cigarette-packages. I need hardly add that the packages might be adapted to receive cigars or any other articles of kindred form.

Having fully described my invention, what I claim as new, and desire to secure by Letters Patent, is—

1. In a machine for making double-ended cigarette-packages, a former composed of two dies normally located in line with each other and means whereby the dies may be moved into parallel planes to permit a double-ended package formed upon them to be stripped from them.

2. In a machine for making double-ended cigarette-packages, a former composed of two pivotal dies normally located in line with each other and movable on their pivots into their stripping positions in which they are located in parallel planes.

3. In a machine for making double-ended cigarette-packages, a former comprising two dies each pivoted at or near its inner end to a suitable support and each provided at its inner end with bell-crank lever for their connection with operating instrumentalities, whereby the dies are normally maintained in the same plane but are adapted to be swung into parallel planes to permit the packages formed upon them to be stripped off.

4. In a machine for making double ended cigarette-packages, the combination with a former composed of two dies normally located in the same plane, of means whereby the dies may be moved into parallel planes to permit the packages formed upon them to be stripped off, folding instrumentalities for folding the package-blanks upon the said dies when in their normal or forming positions, and means for stripping the folded packages from the dies when the same are in their stripping positions.

5. In a machine for making double-ended cigarette-packages, the combination with a former composed of two dies normally located in the same plane in which they are in their normal or forming positions, of means whereby the dies may be moved into parallel planes preparatory to having the packages folded upon them stripped off, folding instrumentalities for folding the package-blanks upon the dies, means for clamping the folded packages upon the dies after the action of the said folding instrumentalities, and a stripping device for stripping off the folded packages from the dies after the same have been moved into their stripping positions.

6. In a machine for making double-ended cigarette-packages, the combination with a former composed of two movable dies normally located in the same plane, of means whereby the dies may be moved into parallel planes preparatory to stripping off the packages formed upon them, means for automatically gumming blanks and conveying the same to the dies, folding instrumentalities for folding the blanks upon the dies, and devices for stripping the folded packages from the dies when the same are moved into their stripping positions.

7. In a machine for making double-ended cigarette-packages, the combination with a former composed of two dies normally located in the same plane, of means whereby the dies may be moved into parallel planes preparatory to having the packages formed upon them stripped off, instrumentalities for successively gumming suitable blanks and conveying them to the dies, initial-folding instrumentalities coacting with the dies for initially folding the blanks, side-flap and end-flap folding instrumentalities for completing the folding of the blanks upon the dies, means for clenching the folding of the blanks, and devices for stripping the folded packages from the dies after the same have been moved into their stripping positions.

8. In a machine for making double-ended cigarette-packages, the combination with gumming and delivering instrumentalities, of a rotatable head carrying a plurality of independently-organized forming mechanisms and the same number of folding instrumentalities which are successively brought into range with the said delivering instrumentalities, each forming mechanism including a former composed of two dies normally located in the same plane and means whereby the dies may be moved into parallel planes to permit the packages formed upon them to be stripped off.

9. In a machine for making double-ended cigarette-packages, the combination with gumming instrumentalities, of instrumentalities for delivering the gummed blanks, a rotatable head, a plurality of independently-organized forming mechanisms carried thereby and each including a former composed of two movable dies to which the blanks are presented sidewise, and upon which they are folded, and initial folders mounted upon vertically-movable carrying-arms which are rotated in unison with the said rotatable head and lifted for the action of the initial formers and depressed when the same are not in use.

10. In a machine for making double-ended cigarette-packages, the combination with blank-gumming and blank-delivering instrumentalities, of a rotatable head carrying a plurality of independently-organized forming mechanisms each having a former composed of two movable dies, initial folders corresponding in number to the number of forming mechanisms and arranged to rotate therewith and to move up and down independently thereof, the side-flap and end-flap folders located in the range of the rotary movement of the said rotatable head and initial folders.

11. In a machine for making double-ended cigarette-packages, the combination with blank-gumming and blank-delivering instrumentalities, of a forming mechanism including two movable dies normally located in the same plane and means whereby the dies may be moved into parallel planes preparatory to stripping off the folded packages, an initial folder comprising a yielding platen and initial-folding plates inclosing a space within which the said platen is located, side-flap and end-flap folding instrumentalities acting upon the blank after it has been initially folded, means for moving the dies into their stripping positions, and devices for stripping the folded packages from the dies.

12. In a machine for making double-ended cigarette-packages, the combination with blank-gumming and blank-delivering instrumentalities, of a forming mechanism comprising two movable dies normally maintained in the same plane and means whereby the dies may be moved into parallel planes to permit the folded packages to be stripped off, two movable clamps located above the respective dies, and means operating the said clamps, whereby they are brought down upon the folded packages, which they press upon the upper faces of the dies, and are then lifted or retired preparatory to stripping off the packages from the dies which are then moved into parallel planes.

13. In a machine for making double-ended cigarette-packages, a forming mechanism comprising two dies each of which is provided at its inner end with a bell-crank, a stem-like die-carrier to which dies are pivoted, and means attached to the bell-cranks of the dies for controlling and operating the same, whereby they are normally maintained in the same plane and moved into parallel planes preparatory to stripping off the folded packages.

14. In a machine for making double-ended cigarette-packages, the combination with blank-gumming and blank-delivering instrumentalities, of a rotatable head carrying independently-organized forming mechanisms each comprising a pair of movable dies and a pair of clamps, means for normally maintaining the said dies in their folding positions in which they lie in the same plane and for moving them into parallel planes to permit the blanks folded upon them to be stripped off, a non-rotatable, vertically-movable lifting-bar located centrally above the said head, a rod passing downward through the center of the head and supporting the said lifting-bar, and means for operating the said rod and hence the said bar which coacts with the said forming mechanisms for operating the said clamps when the said mechanisms are brought into range with it by the rotation of the head.

15. In a machine for making double-ended cigarette-packages, the combination with blank-gumming and blank-delivering instrumentalities, of an intermittently-rotated head carrying independently-organized forming mechanisms to which the gummed blanks are delivered, and side-flap and end-flap folding mechanisms located in position to fold the side flaps and end flaps of the blanks as they are brought into range with it by the rotation of the head, and vertically movable for being brought into operation, and for being retired to clear the said forming mechanisms of the head as the same is rotated.

16. In a machine for making double-ended cigarette-packages, the combination with a rotatable head carrying independently-organized forming mechanisms and provided with a long hollow shaft, of carrying-arms pivotally connected with the said shaft for movement in vertical planes and formed at their inner ends with segmental pinions, vertically-movable racks located within the shaft, engaging with the said pinions and formed at their lower ends with outwardly-projecting operating-arms, vertically-movable rack-operating slides with which the racks are brought into operative range by the rotation of the head, and fixed segmental controllers located at different elevations, grooved for the reception of the said operating-arms formed at the lower ends of the racks and respectively supporting the racks and hence the carrying-arms at their elevated and depressed positions while the head is turned.

17. A machine for making double-ended cigarette-packages, having blank-gumming and blank-delivering instrumentalities comprising a horizontally-movable carriage, two vertically-movable gummers supported by the said carriage, two vertically-movable strippers also supported by the said carriage and located between the two gummers, means for reciprocating the carriage back and forward, and means for reciprocating the two gummers and the two strippers independently of each other without interfering with the movement of the carriage back and forth.

18. In a machine for making double-ended cigarette-packages, the combination with instrumentalities for folding and gumming the blanks, including a former moving in a circular path, of a hopper, a gum-reservoir located in line therewith, and a reciprocating carriage by means of which the blanks are taken from the hopper and conveyed to the reservoir and then delivered to the said former, the said carriage being arranged to reciprocate in a line at a right angle to the path in which the former moves, and to present the blanks sidewise instead of endwise to the former.

In testimony whereof I have signed this specification in the presence of two subscribing witnesses.

FRANK J. LUDINGTON.

Witnesses:
W. E. TREAT,
CHAUNCEY H. WHITE.